(12) United States Patent
Chavan et al.

(10) Patent No.: US 12,117,928 B2
(45) Date of Patent: Oct. 15, 2024

(54) UNITARY TEST PROTOCOLS FOR SOFTWARE PROGRAM APPLICATIONS

(71) Applicant: T-Mobile USA, Inc., Bellevue, WA (US)

(72) Inventors: Raju Chavan, Overland Park, KS (US); Aaron Haehn, Overland Park, KS (US); Aarti Pachauri, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 136 days.

(21) Appl. No.: 17/861,149

(22) Filed: Jul. 8, 2022

(65) Prior Publication Data
US 2024/0012747 A1    Jan. 11, 2024

(51) Int. Cl.
*G06F 11/36*   (2006.01)
*G06F 18/214*  (2023.01)
*G06N 20/00*   (2019.01)

(52) U.S. Cl.
CPC ...... *G06F 11/3692* (2013.01); *G06F 11/3688* (2013.01); *G06F 18/214* (2023.01); *G06N 20/00* (2019.01)

(58) Field of Classification Search
CPC ............. G06F 11/3668; G06F 11/3692; G06F 18/214; G06F 11/3688
See application file for complete search history.

(56) References Cited

U.S. PATENT DOCUMENTS

| | | |
|---|---|---|
| 6,928,638 B2 | 8/2005 | Parvathala et al. |
| 7,093,238 B2 | 8/2006 | Givoni et al. |
| 7,529,977 B2 | 5/2009 | Parvathy et al. |
| 7,536,599 B2 | 5/2009 | Paliwal et al. |
| 7,752,502 B2 | 7/2010 | Clee et al. |
| 7,877,736 B2 | 1/2011 | Houh et al. |
| 7,895,565 B1 | 2/2011 | Hudgons et al. |
| 7,913,231 B2 | 3/2011 | Stienhans et al. |
| 7,917,895 B2 | 3/2011 | Givoni et al. |
| 7,934,200 B2 | 4/2011 | Liu |
| 7,958,495 B2 | 6/2011 | Kelso |
| 7,979,849 B2 | 7/2011 | Feldstein et al. |
| 8,141,043 B2 | 3/2012 | Jones et al. |
| 8,296,736 B2 | 10/2012 | Jones et al. |
| 8,347,267 B2 | 1/2013 | Givoni et al. |

(Continued)

FOREIGN PATENT DOCUMENTS

| | | |
|---|---|---|
| EP | 1514251 A2 | 3/2005 |
| EP | 3467662 A1 | 4/2019 |

(Continued)

*Primary Examiner* — Phillip H Nguyen
(74) *Attorney, Agent, or Firm* — Perkins Coie LLP (57) ABSTRACT

A test orchestration engine can create a unitary test configured to perform multiple tests of an application program with a single journey. The engine can identify actions performable by the application program and determine, based on a machine learning (ML) model, those actions that are performable sequentially to validate a set of features of the application program. The system creates the unitary test protocol including a directed sequence of actions to validate the set of features for the test protocols. The system then causes execution of the unitary test protocol to generate a result indicative of performance of the application program.

20 Claims, 4 Drawing Sheets

(56) References Cited

U.S. PATENT DOCUMENTS

| | | |
|---|---|---|
| 8,392,886 B2 | 3/2013 | Sweis et al. |
| 9,753,842 B2 | 9/2017 | Raghavan et al. |
| 9,811,433 B2 | 11/2017 | Jeong et al. |
| 9,858,090 B2 | 1/2018 | Chalmers et al. |
| 9,952,855 B2 | 4/2018 | Finnie et al. |
| 10,438,118 B2 | 10/2019 | Dwarakanath et al. |
| 11,222,281 B2 | 1/2022 | Kozhaya et al. |
| 2005/0204201 A1* | 9/2005 | Meenakshisundaram ................ G06F 11/3664 714/E11.208 |
| 2005/0262410 A1 | 11/2005 | Parvathala et al. |
| 2006/0259629 A1 | 11/2006 | Usmani et al. |
| 2008/0244524 A1 | 10/2008 | Kelso |
| 2009/0300585 A1* | 12/2009 | Meenakshisundaram ................ G06F 11/3688 717/124 |
| 2013/0042222 A1 | 2/2013 | Maddela |
| 2018/0053233 A1* | 2/2018 | Srivastava .......... G06F 16/2455 |
| 2019/0188116 A1 | 6/2019 | Roth |
| 2020/0117583 A1* | 4/2020 | Durairaj .............. G06F 11/3692 |
| 2021/0279577 A1* | 9/2021 | West ...................... G06N 3/045 |
| 2021/0303451 A1 | 9/2021 | Belihomji et al. |
| 2021/0334593 A1 | 10/2021 | Vo et al. |
| 2021/0406146 A1 | 12/2021 | Lange et al. |
| 2022/0150151 A1 | 5/2022 | Ramamoorthy et al. |

FOREIGN PATENT DOCUMENTS

| | | |
|---|---|---|
| EP | 3889784 A1 | 10/2021 |
| WO | 2009073872 A1 | 6/2009 |
| WO | 2014113376 A1 | 7/2014 |
| WO | 2020055615 A1 | 3/2020 |
| WO | 2020086757 A1 | 4/2020 |

* cited by examiner

UNITARY TEST PROTOCOLS FOR SOFTWARE PROGRAM APPLICATIONS

BACKGROUND

Software testing is the act of examining the artifacts and the behavior of the software under test by validation and verification. Software testing can also provide an objective, independent view of the software to allow a business to appreciate and understand the risks of software implementation. Software testing techniques include, but not necessarily limited to analyzing product requirements for completeness and correctness in various contexts like industry perspective, business perspective, feasibility and viability of implementation, usability, performance, security, and infrastructure considerations.

Software testing techniques include reviewing product architecture and design, tests that are written as part of code based on various techniques like boundary conditions, executing an application program with the intent of examining behavior, reviewing deployment infrastructure and associated scripts and automation, and taking part in production activities by using monitoring and observability techniques. Software testing can thus provide objective, independent information about the quality of software and risk of its failure to users.

Levels of testing include unit testing, integration testing, system testing, and end-to-end testing. Unit testing refers to tests that verify a specific section of code, usually at the function level. Integration testing can refer to any type of software testing that seeks to verify interfaces between components against a software design. System testing can test a completely integrated system to verify that the system meets its requirements. For example, a system test can involve testing a login interface on a smartphone, creating and editing an entry, sending or generating a call, followed by summary processing or deletion entries, then logoff. An end-to-end test under product-like circumstances to replicate live settings.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a test orchestration engine ("engine") that can generate a unitary test that replaces multiple tests of a software testing process with a single test. That is, the unitary test is configured to perform multiple tests on a software application program (also referred to herein as an "application program") with a single journey. The engine can identify features of the application program and associated actions that are performable to test the features. The multiple tests are normally performed separately, one after the other, to validate each feature (e.g., capability) separately by performing a sequence of actions defined for a user journey. The engine can determine how to order the actions of multiple tests in a single sequence, to validate the features of the application program with a single test (the "unitary test"). Thus, the system generates the unitary test including a sequence for performing a set of actions to validate the features otherwise tested in the multiple tests. The unitary test is executed to generate results indicative of the performance of the application program in response to the unitary test.

In one example, the disclosed technology improves processes to develop software by introducing a mechanism for orchestrating testing with a single test that evaluates concepts (e.g., features) for a given software release or package, by defining a unitary test protocol at a given scope. Examples of the mechanism include an orchestration engine that can automate and improve on quality-of-service architects to evaluate software development projects. The orchestration engine can include a machine learning (ML) model to improve test generation autonomously. The disclosed technology thus addresses drawbacks of software testing for a common project, which is currently performed by different teams, with different tests, and at different times, despite that any one test can impact other tests for the same or different application programs, including a different release/package. Benefits of the disclosed technology include high level visibility of quality engineering software products for a given release/package and avoids duplicate testing/journeys in application programs for project/concepts across testing teams. The technology additionally offers the ability to share quality artifacts among the teams for enterprise level reporting and to reduce cost.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines (SVMs), decision trees, Parzen windows, Bayes, clustering, reinforcement learning, probability distributions, decision trees, decision tree forests, and others. Models can be configured for various situations, data types, sources, and output formats.

In some implementations, the ML model can be a neural network with multiple input nodes that receive data about application programs, concepts, features, events, actions, verification points), and test protocols. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as generate a unitary test with a sequence of actions for validating features of an application program. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

An ML model can be trained with supervised learning, where the training data includes historical data of application programs and testing protocols as input and a desired output, such as actions that are not mutually exclusive and, as such, can be arranged in a single sequence for testing numerous features that otherwise required several tests. A representation of a unitary test can be provided to the model. Output from the model can be compared to the desired output for that unitary test and, based on the comparison, the model can be modified, such as by changing weights between nodes of the neural network or parameters of the functions used at each node in the neural network (e.g., applying a loss function). After applying each of the tests in the training data and modifying the model in this manner, the model can be trained to evaluate new tests.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Software Test Protocols

Software testing can determine the correctness of an application program under the assumption of some specific hypotheses but cannot identify all the failures within the application program. Instead, testing furnishes a criticism or comparison that compares the state and behavior of the product against test oracles, which are principles or mechanisms by which someone might recognize a problem. These oracles may include, but are not limited to, specifications, comparable products, past versions, inferences about intended or expected purpose, user or customer expectations, relevant standards, or other criteria.

A primary purpose of testing is to detect program failures so that defects are discovered and corrected. Testing cannot establish that an application program functions properly under all conditions, but only that it does not function properly under specific conditions. The scope of testing may include the examination of code as well as the execution of that code in various environments and features as well as examining the aspects of code. In software development, a testing organization of teams is separate from the development team. There are various roles for testing teams. Information derived from software testing may be used to correct the process by which software is developed.

Figure 1:
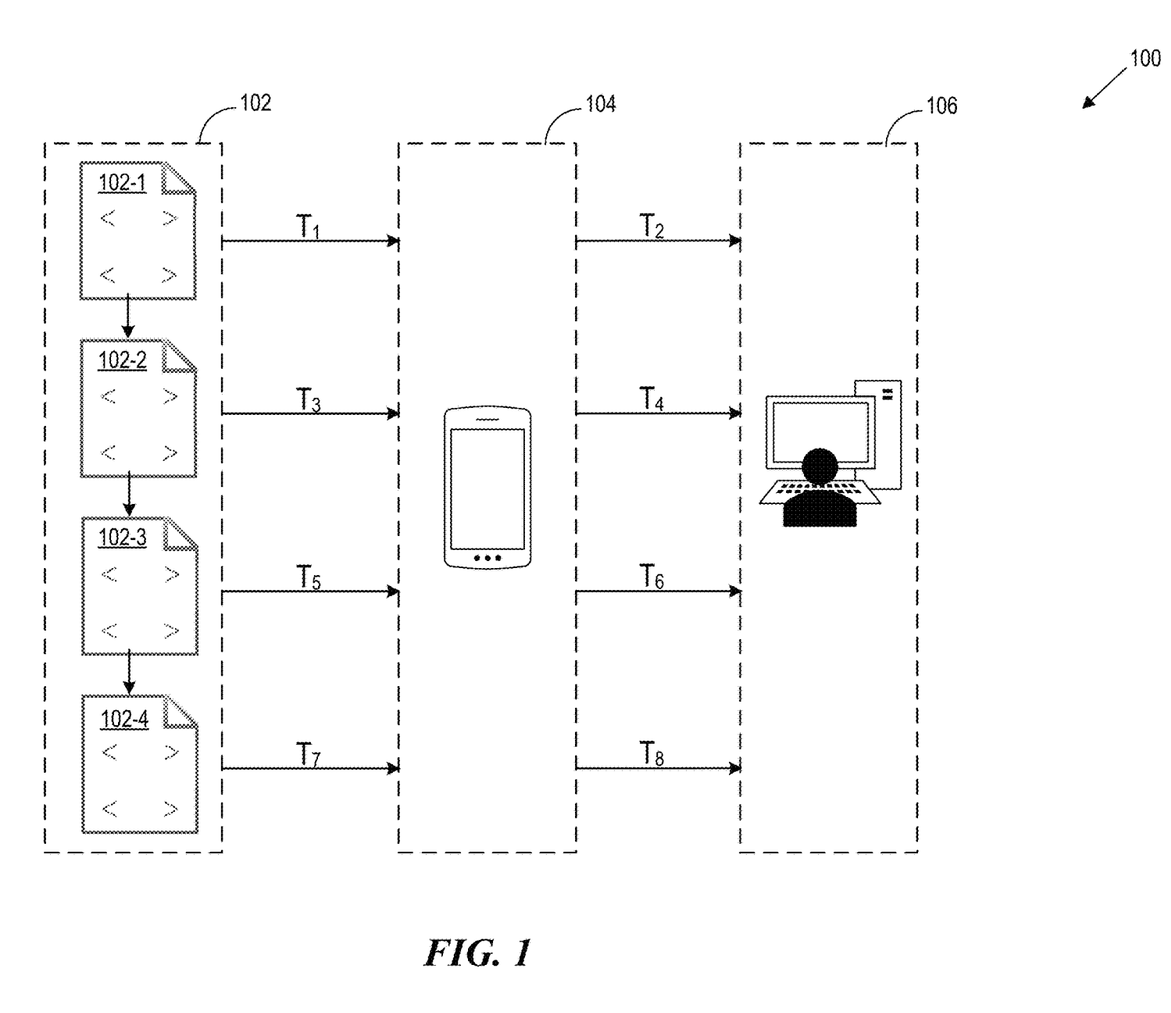
FIG. 1 is a block diagram that illustrates a system for deploying multiple test protocols in a serial process to validate an application program.

FIG. 1 is a block diagram that illustrates a system for deploying multiple test protocols in a serial process to validate an application program. The system 100 is configured to perform multiple levels of software testing in a serial manner. That is, once one test is complete, another test is initiated, followed by another test, and so on. A subsequent test can be built on prior tests. Each test has its own protocol that test concepts (e.g., features) by performing one or more actions. The features can include capabilities of an application program such as a payment capability, a communications capability, a service capability, etc. A feature can include any operation of the application (e.g., which a user can engage) that operates a function or increases usability of the application. An action can include an operation of the feature such as actuating a control on a user interface to initiate a service subscription or payment to purchase a device, or an action to initiate a communications link between a user device and a remote server. Although some actions that are scheduled to perform for different tests are mutually exclusive, many are not. As such, the tests that are performed serially can have functional redundancies.

The system 100 includes different test protocols 102-1 through 102-4 (collectively referred to as "test protocols 102" or "tests 102"). As illustrated, the tests 102 are at different levels and are performed at different times. Tests are frequently grouped into one of these levels by where they are added in the software development process, or by the level of specificity of the test. Examples of the tests 102 include a unit test, an integration test, a system test, and end-to-end test.

A unit test protocol can test one or more software modules and associated control data, usage procedures, and/or operating procedures to determine fit for use of the application program. Unit testing can refer to tests that verify the functionality of a specific section of code, usually at the function level. In an object-oriented environment, this is usually at the class level. Unit testing types of tests are usually written by developer teams as they work on code to ensure that the specific function is working as expected. Unit testing alone cannot verify the functionality of a piece of software, but rather is used to ensure that the building blocks of the software work independently from each other.

Moreover, unit testing is a software development process that involves a synchronized application of a broad spectrum of defect prevention and detection strategies in order to reduce software development risks, time, and costs. It is performed by the software developer or engineer during the construction phase of the software development life cycle. Unit testing aims to eliminate construction errors before code is promoted to additional testing, which can increase the quality of the resulting software as well as the efficiency of the overall development process. Depending on the organization's expectations for software development, unit testing might include static code analysis, data-flow analysis, metrics analysis, peer code reviews, code coverage analysis and other testing practices.

An integration test protocol can test one or more software modules or subsystems that are assembled to evaluate compliance with specified functional requirements of an application program. In general, integration testing is any type of software testing that seeks to verify the interfaces between components against a software design. Software components may be integrated in an iterative way or all together. Integration testing works to expose defects in the interfaces and interaction between integrated components (e.g., modules, subsystems). Progressively larger groups of tested software components corresponding to elements of the architectural design are integrated and tested until the software works as a system. Integration tests usually involve voluminous amounts of code, and produce traces that are larger than those produced by unit tests.

A system test protocol can test a complete system that supports one or more software modules or subsystems of an application program, which are tested to evaluate compliance with specified functional requirements. In general, system testing tests a completely integrated system to verify that the system meets its requirements. For example, a system test might involve testing a login interface, then creating and editing an entry, sending or printing results, followed by summary processing, deletion, or archiving of entries, then logoff.

An end-to-end testing protocol can be configured to test functionality and performance of an application program under product-like circumstances. End-to-end testing can be in the form of operational acceptance testing or be simple end-user (e.g., beta) testing to ensure that the application program meets functional expectations. End-to-end testing can test operational readiness (e.g., pre-release) of a product, service, or system as part of a quality management system. The testing can focus on the operational readiness of the system to be supported, or to become part of the production environment. Hence, it can also be known as operational readiness testing or operations readiness and assurance testing. Functional testing can be limited to those tests that are required to verify the non-functional aspects of the system.

The test protocols 102 are separate and distinct tests that can be implemented serially (one after the other) on a device 104 (e.g., smartphone). The results of the test protocols are likewise serially received and evaluated at the test operator subsystem 106. More specifically, the test protocol 102-1 (e.g., unit test) is performed on the device 104 at T1 and results are generated at T2 for analysis by the subsystem 106. The test 102-2 (e.g., integration test) is then performed on the device 104 at T3 and results are generated at T4 for analysis by the subsystem 106. The test 102-3 (e.g., system test) is next performed on the device 104 at T5 and results are generated at T6 for analysis by the subsystem 106. Lastly, the test 102-4 (e.g., end-to-end test) is performed on the device 104 at T7 and results are generated at T8 for analysis by the subsystem 106.

The disclosed technology improves over separate testing processes that have respective journeys with a unitary journey that has multiple verification points. An example first concept can include a credit check, which can involve obtaining credit information from multiple systems. A verification can include having a seamless credit check in all journeys where the credit check takes place. An example second concept includes adding a shipping option (e.g., express same-day delivery for $20) when the user orders goods (e.g., mobile phone). A verification can include onscreen selection of the option and applying the additional cost to the cart. The disclosed technology can test both concepts in the unitary journey, which avoids duplicative processes and is more cost-efficient.

In one example, a new concept/project A offers a new service plan at a lower cost (e.g., "low-cost plan") for a new customer, a concept/project B allows credit card payments for a new customer, and a concept/project C adds a new term or condition to accept when a customer purchases a new device. The disclosed technology can analyze concepts/ projects A, B, and C to build a unitary journey for "new customer activation." Hence, one test can include three different verifications. For example, a new customer can select a "low-cost plan" for device activation, is able to make a payment by choosing a credit card option, and can review and agree to terms and conditions before submitting to accept activation. A first verification involves the customer selecting the new plan, which is a requirement associated with concept/project A. A second verification involves the customer selecting a credit card method of payment, which is a requirement associated with concept/project B. A third verification involves allowing the customer to see, review, and accept new terms and conditions, which is a requirement associated with concept/project C. The unitary test can thus check all three verifications as a common journey that includes the three verifications at different points in time. In one example, a report is generated and includes test results indicating pass/fail of each verification. If all the verification are passed, the unitary journey for the release/package is passed. If any of the three verifications fail, the journey for the release or package fails.

Figure 2:
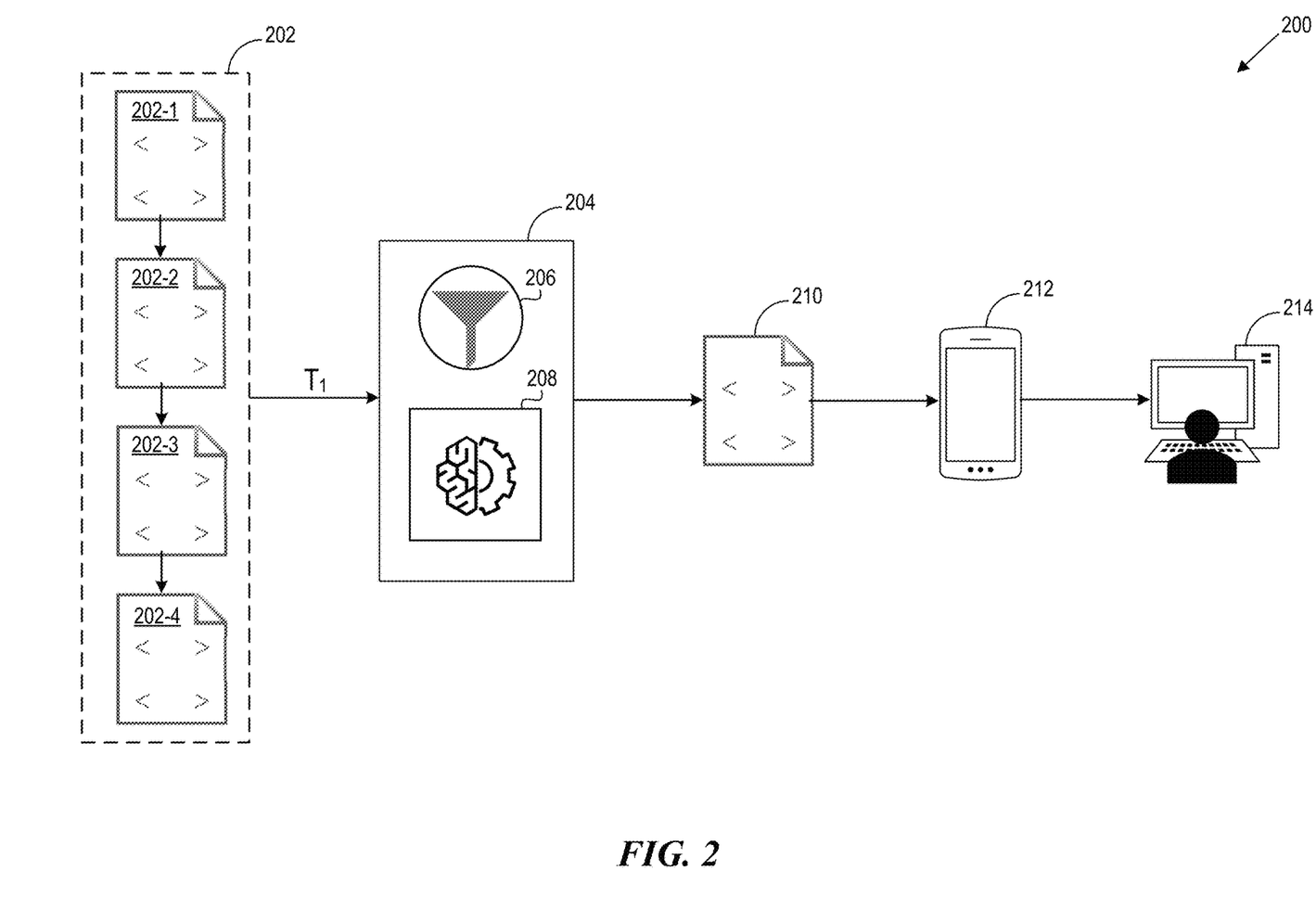
FIG. 2 is a block diagram that illustrates a system for generating a unitary testing protocol to validate an application program.

FIG. 2 is a block diagram that illustrates a system for generating a unitary test protocol to validate an application program. The system 200 can design a unitary test protocol to have a single sequence of actions of a journey configured to test multiple features of multiple tests for an application program. Moreover, the unitary test can have different scopes depending on the number of features that are being tested. The unitary test design thus enables greater and dynamic test coverage with fewer or only one test.

The system 200 starts with multiple test protocols 202 (e.g., unit test, integration test, system test, end-to-end test) that are collectively input to a test orchestration engine 204, which can create a unitary test protocol 210 that obviates the need for the multiple test protocols 202. Thus, the unitary test protocol 210 can be executed to test performance of the application program on a device 212, to obtain results as if the multiple test protocols 202 were performed. The orchestration engine 204 includes a sorting mechanism 206 that can identify multiple actions of the multiple test protocols 202 that are performable by the application program on the user device 212. The multiple actions are performable as journeys in test protocols configured to validate one or more features of the application program. Each journey of a test protocol can include a sequence of one or more actions.

The orchestration engine 204 can include a machine learning (ML) model 208 that can determine a set of actions of the multiple actions that are non-mutually exclusive and are performable sequentially to validate the set of features of the application program. In one example, the ML model is generated based on a knowledgebase of testing protocols and verifications for multiple features of multiple application programs. The ML model is trained based on multiple journeys of users on one or more application programs including analogous actions performed by application programs on multiple user devices.

The orchestration engine 204 generates the unitary test protocol 210 including a unitary sequence for performing the set of actions to validate the set of features for the separate and distinct test protocols 202 with a single test. The unitary test protocol 210 is caused to execute on the device 210, which generates a result indicative of the performance of the application program in response to performing the unitary sequence of the set of actions. An indication of the result can be output on a display device of the subsystem 214. For example, the indication can indicate pass/fail for each feature tested by the unitary test protocol 210.

Figure 3:
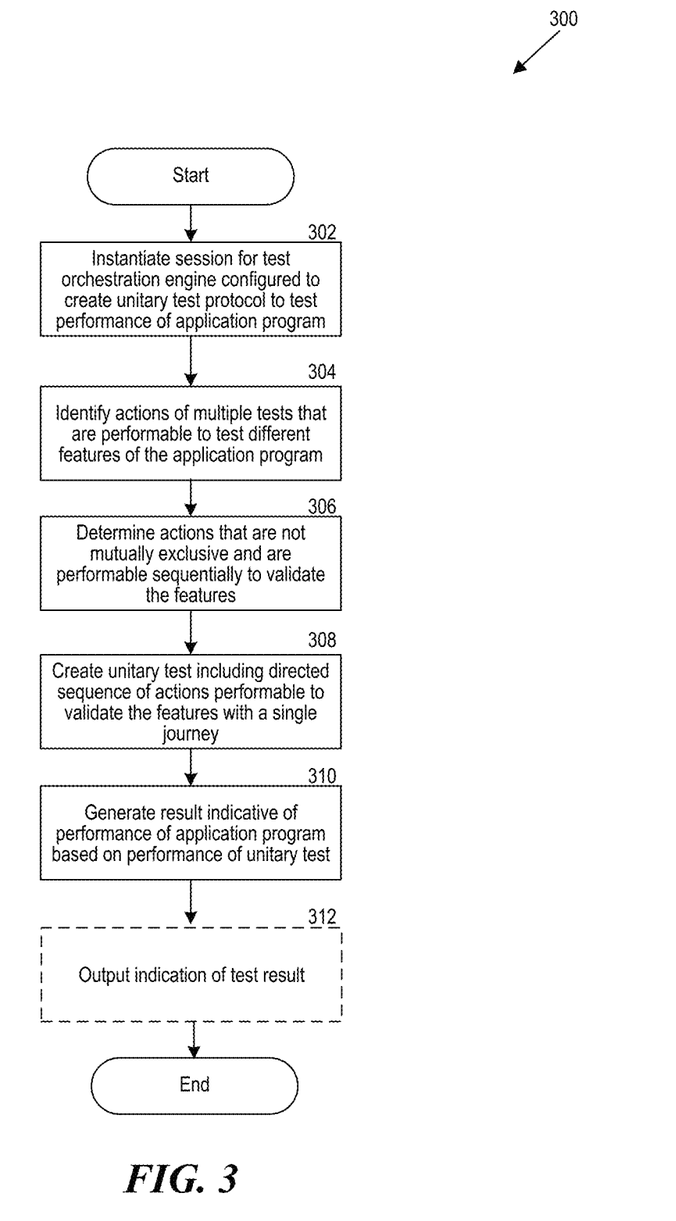
FIG. 3 is a block diagram that illustrates a process for generating and utilizing a unitary testing protocol to validate an application program.

FIG. 3 is a block diagram that illustrates a process for generating and utilizing a unitary test protocol to validate an application program. The process 300 can be performed by a test orchestration engine including hardware and/or software configured to execute the elements of the process 300. For example, the test orchestration engine can reside on a server in a test system for a telecommunications network. The test orchestration engine is configured to test an application program such as a mobile app and/or the user device (e.g., wireless device) on which the mobile app resides.

At 302, the system can instantiate a session for a test orchestration engine to create a unitary test having a scope of testing that is equivalent of multiple tests for an application program on a user device (e.g., smartphone). That is, the unitary test is configured to validate multiple features by performing the equivalent of multiple tests on the application program with a single journey of the unitary test. Examples of test protocols include a unit test, an integration test, a system test, and an end-to-end test. As indicated earlier, a unit test protocol can be configured to test one or more software modules of the application program and associated control data, a usage procedure, and/or an operating procedure to determine fit for use. An integration test protocol is configured to test integration of one or more software modules or subsystems associated with the application program to evaluate compliance with a functional requirement. A system test protocol is configured to test a complete system that supports the one or more software modules or subsystems to evaluate compliance with a specified functional requirement. An end-to-end test protocol is configured to test functionality and performance of the application program under a product-like circumstance.

At 304, the system can identify multiple actions performable by the application program on the user device. The multiple actions are identified from the separate and distinct test protocols, which are separately configured to validate a set of features of the application program. More specifically, each of the multiple test protocols are configured to test a journey, which includes a sequence of one or more actions. In one example, the multiple actions include user interactions with controls presented by the application program on a display device of a user device (e.g., button click, communication link). In another example, the multiple actions are configured to control performance of an operation associated with a feature of the application program. In one example, the user device is a wireless device of a telecommunications network and the set of features of the application program can include a payment capability, a capability to execute a purchase operation, and a capability to add a service of the telecommunications network to a subscription of the wireless device.

At 306, the system is caused to determine, based on a machine learning (ML) model, a set of actions of the multiple actions that are not mutually exclusive and are performable sequentially to validate a set of features of the application program. For example, the system can select, based on the ML model, a set of actions based on historical data including analogous sequences of actions used to test features of multiple application programs. The ML model can be trained based on multiple journeys on the same or different application programs on the same or different user devices. In one example, the ML model is generated based on a knowledgebase of test protocols and verifications for multiple features of one or more application programs. The ML model is trained based on multiple journeys of the application programs that perform analogous actions on multiple user devices. The system can also train the ML model based on results indicative of performance of the application program in response to performing unitary tests. For example, a unitary test can define a sequence of actions to validate a group of features of an application program. The results of the unitary test can be compared to the results of multiple tests for different features, which are replaced by the unitary test. The results of the unitary test and the multiple tests are compared to determine a deviation, which can be used to adjusts weights of the ML model depending on whether the deviation exceeds or is below respective thresholds.

At 308, the system generates the unitary test protocol including a directed sequence of actions for performing the set of actions to validate the set of features for the separate and distinct test protocols. For example, the system can isolate an action of each journey and evaluate an effect of each isolated action to validate a feature of the application program. That is, the system can select, based on an ML model, the set of actions based on historical data including analogous events of prior tests applied to multiple application programs. For example, the system can isolate actions of journeys from separate and distinct test protocols and evaluate an effect of each action on verification of a feature of the application program. The system can then determine an order for the selected actions to define a directed sequence for a single journey on the application program. The unitary test protocol is then created as an executable journey to perform the directed sequence of actions on the application program to test features that would otherwise require multiple different tests.

At 310, the system can execute the unitary test protocol to generate a result indicative of performance of the application program based on performance of the directed sequence. The results can include an indication of whether the tested features passed/failed specified criteria (e.g., function as expected and are valid). For example, the results can indicate that the application program passed the equivalent of one or more separate tests but not others.

At 312, the system can output, on a display device, an indication of the results. The indication of the result can include a status for each of the separate and distinct test protocols. The results can be presented as raw data or in visualizations. Once the process is complete, the system can terminate the session of test orchestration engine.

The system can generate multiple and different unitary test protocols having different scopes. For example, the system can generate an additional unitary test protocol that defines an additional unitary sequence for performing another group of actions to validate another set of features of the separate and distinct test protocols and an additional test protocol. The system can then cause execution of the additional unitary test protocol to generate an additional result indicative of performance of the application program in response to performance of the additional unitary sequence.

Computer System

Figure 4:
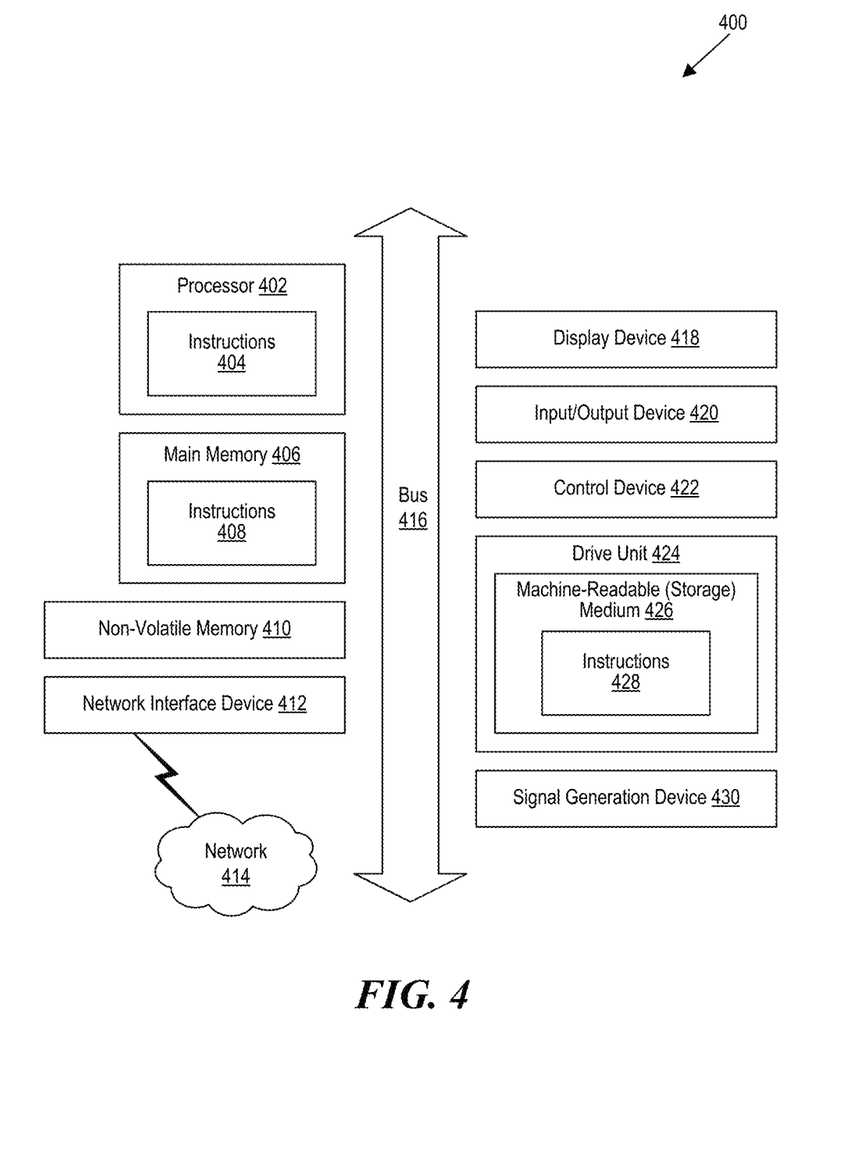
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/ output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:
instantiate a session for a test orchestration engine to perform a scope of testing that is equivalent of multiple tests for an application program on a user device;
identify multiple actions performable by the application program on the user device,
wherein the multiple actions are performable in respective journeys of separate and distinct test protocols configured to validate a set of features of the application program, and
wherein each journey includes a sequence of one or more actions;
determine, based on a machine learning (ML) model, a set of actions of the multiple actions of at least two journeys that are non-mutually exclusive and are performable sequentially to validate the set of features of the application program,
wherein the ML model is generated based on a knowledgebase of test protocols and verifications for multiple features of one or more application programs, and
wherein the ML model is trained based on multiple journeys on the one or more application programs that perform analogous actions on multiple user devices;
create a unitary test protocol including a directed sequence for the set of actions to validate the set of features for the separate and distinct test protocols with a single journey of the unitary test protocol; and
cause execution of the unitary test protocol to generate a result indicative of performance of the application program based on performance of the single journey including the directed sequence of the set of actions.

2. The computer-readable storage medium of claim 1, wherein the system is further caused to:
output, on a display device of the system, an indication of the result, wherein the indication of the result includes a status for each of the set of features.

3. The computer-readable storage medium of claim 1, wherein the system is further caused to:
generate an additional unitary test protocol that defines an additional unitary sequence for performing another group of actions to validate another set of features of the separate and distinct test protocols and an additional test protocol; and
cause execution of the additional unitary test protocol to generate an additional result indicative of performance of the application program in response to performance of the additional unitary sequence,
wherein the additional result is caused to display on a display device of the system.

4. The computer-readable storage medium of claim 1, wherein the separate and distinct test protocols comprise two or more of:
a unit test protocol configured to test one or more software modules of the application program and associated control data, a usage procedure, or an operating procedure to determine fit for use,
an integration test protocol configured to test integration of one or more software modules or subsystems associated with the application program to evaluate compliance with a specified functional requirement,
a system test protocol configured to test a complete system that supports the one or more software modules or subsystems to evaluate compliance with a specified functional requirement, and
an end-to-end test protocol configured to test functionality and performance of the application program under a product-like circumstance.

5. The computer-readable storage medium of claim 1, wherein the system is further caused to:
train the ML model based on the result indicative of performance of the application program based on performance of the single journey including the directed sequence of the set of actions; and
terminate the session for a test orchestration engine.

6. The computer-readable storage medium of claim 1:
wherein the user device is a wireless device of a telecommunications network, and wherein the set of features of the application program includes a payment capability, a capability to execute a purchase operation, and a capability to add a service of the telecommunications network to a subscription of the wireless device.

7. The computer-readable storage medium of claim 1, wherein to identify the multiple actions performable by the application program comprises causing the system to:
isolate actions of the journeys of the separate and distinct testing protocols; and
evaluate an effect of each action on verification of a feature of the application program.

8. The computer-readable storage medium of claim 1, wherein the multiple actions include user interactions with controls presented by the application program on a display device of user devices, and wherein the multiple actions are configured to control performance of an operation associated with a feature of the application program.

9. The computer-readable storage medium of claim 1, wherein the ML model is trained based on multiple journeys performed on the application program on the user device or multiple user devices.

10. The computer-readable storage medium of claim 1, wherein the ML model is trained based on multiple journeys performed on different application programs on the user device or multiple user devices.

11. The computer-readable storage medium of claim 1, wherein to generate the unitary test protocol comprises causing the system to:
determine an order for the set of actions of the unitary sequence as a directed acyclic journey on the application program; and
generate the unitary test protocol as an executable journey to perform the directed sequence on the application program.

12. A test engine comprising:
at least one hardware processor; and
at least one non-transitory memory storing instructions, which, when executed by the at least one hardware processor, cause the test engine to:
identify multiple actions of multiple journeys for testing an application program,
wherein each journey includes a sequence of one or more actions;
select a set of actions of at least two journeys the multiple journeys to validate the application program,
wherein the set of actions precludes mutually exclusive actions of the multiple journeys;
create a unitary test that defines a single journey including the set of actions arranged in a preset order configured to validate a feature of the application program based on performance of the single journey; and
cause execution of the unitary test to generate a result indicative of whether the application program passed the unitary test.

13. The test engine of claim 12 further caused to, prior to the multiple actions of the multiple journeys being identified:
receive a set of test protocols including a unit test, an integration test, a system test, and an end-to-end test for the application program,
wherein the set of test protocols includes the multiple journeys for testing the application program separately for each journey.

14. The test engine of claim 12, wherein to select the set of actions from the multiple journeys to validate the application program comprises causing the test engine to:
determine, based on a machine learning (ML) model, the set of actions selected based on historical data including analogous actions of tests for multiple application programs.

15. The test engine of claim 12, wherein to select the set of actions of the multiple journeys to validate the application program comprises causing the test engine to:
determine the set of actions selected based on a machine learning (ML) model generated from a supervised knowledgebase.

16. The test engine of claim 12, wherein to select the set of actions of the multiple journeys to validate the application program comprises causing the test engine to:
generate an additional unitary test including a combination of the set of actions and an additional action,
wherein the additional action is inserted in the ordered set of actions to validate a set of features based on performance of another single journey that includes the additional action.

17. The test engine of claim 12, wherein to select the set of actions of the multiple journeys to validate the application program comprises causing the test engine to:
isolate an action of each journey; and
evaluate an effect of each isolated action on verification of the feature of the application program.

18. A computer-readable storage medium, excluding transitory signals and carrying instructions, which, when executed by at least one data processor of a system, cause the system to:
receive a set of test protocols including two or more of a unit test, an integration test, a system test, or an end-to-end test for an application program,
wherein each test protocol includes a journey of multiple journeys for separately testing an application program, and
wherein each journey includes a sequence of one or more actions;
select a set of actions from at least two journeys the multiple journeys to validate an application program,
wherein the set of actions precludes mutually exclusive actions of the multiple journeys;
generate a unitary test that orders the set of actions to validate a set of features of the application program with a single journey; and
cause execution of the unitary test to generate a result indicative of whether the application program passes the set of test protocols based on performance of the single journey.

19. The computer-readable storage medium of claim 18, wherein to generate the unitary test protocol comprises causing the system to:
determine an order for the set of actions for the single journey as a directed acyclic journey on the application program.

20. The computer-readable storage medium of claim 18, wherein the system is further caused to:
output, on a display device of the system, an indication of the result,
wherein the indication of the result includes a status for each of the set of test protocols.

* * * * *